Dec. 19, 1967     H. E. BRANSON     3,358,447

HYDRAULIC BRAKE SYSTEM

Filed March 7, 1966

INVENTOR.
Henry E. Branson,
BY Parker & Carter
Attorneys.

United States Patent Office 3,358,447
Patented Dec. 19, 1967

3,358,447
HYDRAULIC BRAKE SYSTEM
Henry E. Branson, Chicago, Ill., assignor to Stromberg Hydraulic Brake & Coupling Company, Chicago, Ill., a corporation of Illinois
Filed Mar. 7, 1966, Ser. No. 532,332
6 Claims. (Cl. 60—54.5)

This invention relates to improvements in tractor trailer hydraulic brake systems for automotive vehicles and has for one object to provide a trailer brake system associated with the tractor brake system wherein the danger of brake failure is minimized and wherein the brakes on tractor and trailer are simultaneously controlled by the driver.

An automotive vehicle which may or may not be used as a tractor is provided with a conventional dual brake system wherein a master tractor cylinder may, through a plurality of separate hydraulic systems apply brake pressure to a plurality of separate wheels, for example to front and rear wheel brakes.

The tractor carries in addition a hydraulic brake system which includes a trailer master cylinder through which the operator may apply brakes on the trailer. There is interposed between the tractor master cylinder and some of the vehicle brakes, means whereby upon manipulation of the trailer master cylinder, the connection between the tractor master cylinder and some of the brakes may be temporarily disconnected and brake pressure may be applied by the trailer master cylinder to such brakes independent of the tractor master cylinder. The systems responsive to the two master cylinders are so interconnected that there is no possible mixing of hydraulic fluid in the two systems.

The proposed system provides a wide measure of safety and a wide range of operating choices. The tractor driver may apply brakes separately to selected wheels on the tractor, for example, the front or rear wheels or he may apply brakes to the rear tractor wheels only, or he may apply brakes to selected tractor wheels and to the wheels on the trailer.

The invention is illustrated more or less diagrammatically in the accompanying drawings, wherein.

Like parts are indicated by like numerals throughout the specification and drawings.

Figure 1:
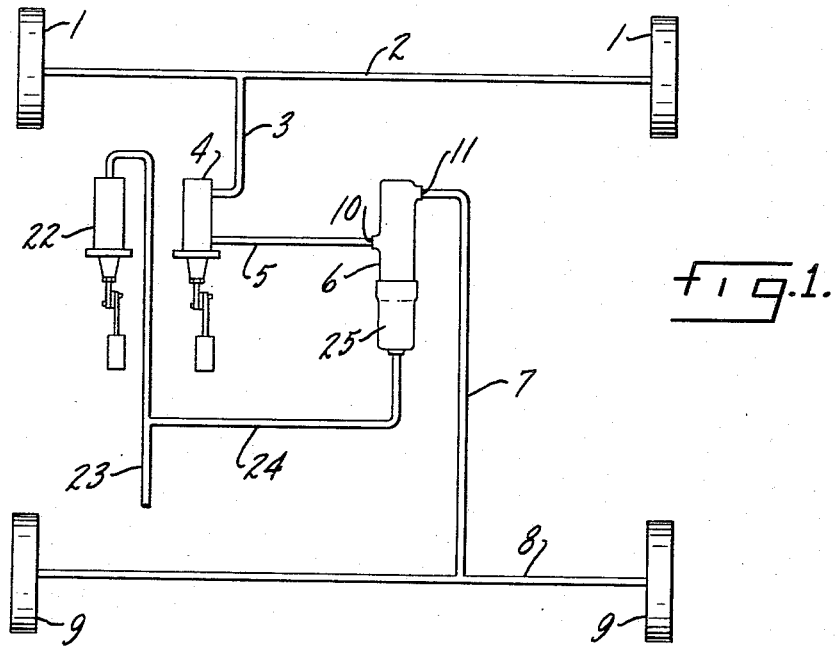
FIGURE 1 is a diagrammatic flow sheet.

The operation of the trailer brake system and the connection between the trailer and the tractor are well illustrated in Patent No. 3,076,313 and need no illustration in this connection.

The tractor has front wheel brakes 1, 1, connected in parallel by ducts 2 and 3 with the tractor master cylinder 4 operated by the driver. A duct 5 leads from master cylinder 4 to slave cylinder 6. The duct 7 leads from slave cylinder 6 through duct 8 to connect the tractor rear wheel brakes 9 in parallel.

Figure 2:
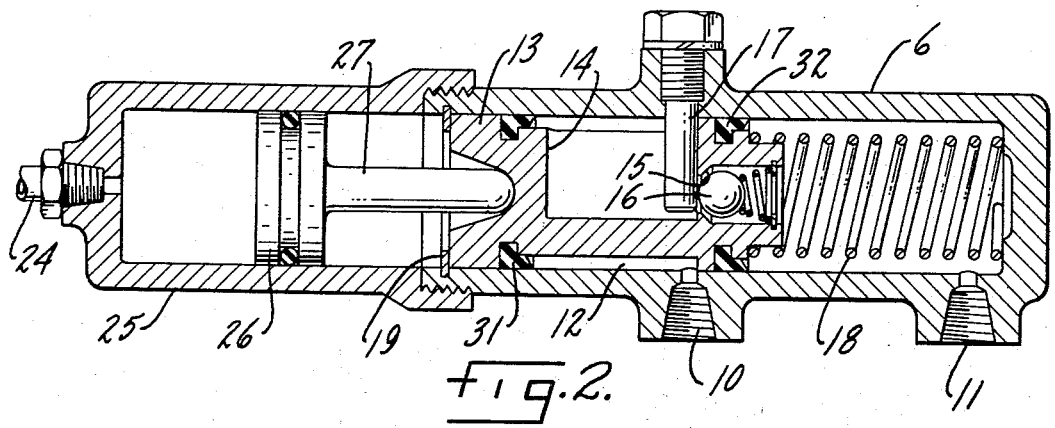
FIGURE 2 is a section in part elevation of an auxiliary slave cylinder.

Referring to FIGURE 2, the slave cylinder 6 has an inlet port 10 receiving the duct 5 and an outlet port 11 connected to the duct 7. In the position shown in FIGURE 2, hydraulic pressure from the master cylinder 4 enters the clearance 12 about the piston 13 in the slave cylinder 6. A slot 14 in the piston is open to the clearance 12 and a valve seat 15 in the downstream end of the piston communicates with the slot 14 and may be closed by the ball valve 16 unseated by contact with the stop pin 17 when the return spring 18 holds the piston in the upstream position against the stop 19. At this time, hydraulic fluid may pass from the master cylinder 4 through duct 5, inlet 10, clearance 12, groove 14, valve seat 15 to exit 11 and thence through the duct system 7 and 8 to apply pressure on the rear brakes as well as the front brakes when the master cylinder 4 is manipulated.

Equally accessible to the driver as the master cylinder 4 is the auxiliary trailer control master cylinder 22 which supplies pressure to the trailer brake operating connection through the duct 23 quite independent of the brake system on the tractor. The duct 24 leads from the duct 23 to the actuating cylinder 25 which through piston 26, push rod 27 may apply pressure to move the piston 13 to seat the valve 16 as brakes are applied to the trailer. Such seating of the valve 16 as the piston 13 moves downstream shuts off the connection between the master cylinder 4 and the rear wheels. At the same time movement of the piston 13 in slave cylinder 6 exerts pressure through the ducts 7 and 8 on the rear tractor wheels independent of the master cylinder 4. Thus brakes are applied on the front and rear wheels of the tractor and on the trailer. If the operator takes his foot off the pedal on master cylinder 4, brake pressure is not applied to the front wheels but brake pressure is still applied to the rear wheels and to the trailer.

Figure 3:
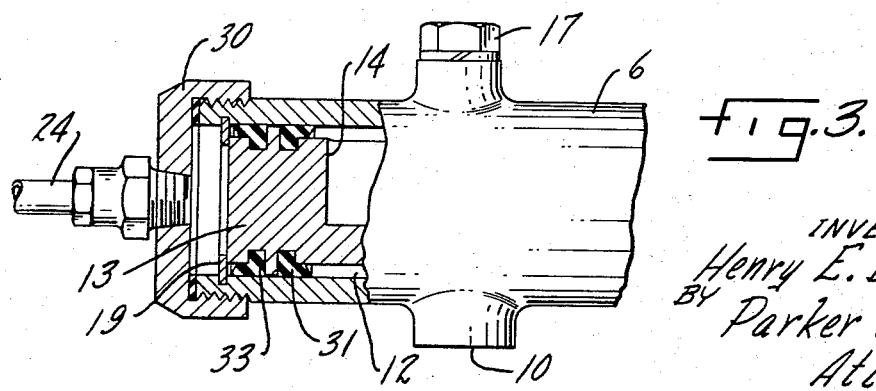
FIGURE 3 is a side elevation in part section of a modified form of slave cylinder.

In the modified form of FIGURE 3, the actuating cylinder 25 is omitted. A cap 30 is substituted therefor to close the end of the slave cylinder 6. In this case, the duct 24 discharges directly through the cap 30 to exert pressure against the head of the piston 13 to accomplish exactly the same result as is accomplished by the actuating cylinder 28. I have called the cylinder 6 a slave cylinder because the piston in it is not actuated mechanically by the pedal pressure exerted by the driver's foot but it is actuated either through the actuating cylinder or by hydraulic pressure applied to the head of the piston 13 to shut off pressure from the cylinder 4 while permitting pressure from the cylinder 22 to actuate the rear tractor brakes.

In the form shown in FIGURE 2, the piston 13 carries packing rings 31 and 32 adjacent each end of the piston. In the modified form shown in FIGURE 3, the piston carries a third packing ring 33 in opposition to the packing ring 31 to assist in preventing any possible hydraulic connection between ducts 5 and 7 on the one hand and duct 24 on the other.

If a trailer is not connected to a tractor and duct 23 is closed and the operator by mistake applies the brakes on the tractor master cylinder, he gets the same result that he would get if the system were not on the tractor. If, on the other hand, he should apply brake pressure only to the trailer master cylinder, he would get brake pressure on the rear wheels of the tractor, leaving the front wheel brakes without braking effect.

The reason for the dual brake system is that a failure in the brake line to save the wheels will not affect the brake line to the other wheels so that some braking effect is still available whereas with a single system, failure knocks out the whole brake system. By the addition of the trailer master cylinder to the dual brake system, if one set of tractor brakes fails, the trailer master cylinder is still available to actuate another set of brakes.

The word "dual" applied to brake systems is to be interpreted broadly to cover two or more separate hydraulic circuits whereby pressure may be transmitted from two or more master cylinders to separate brakes on the vehicle responsive to a single operation by the driver.

I claim:

1. In combination, a dual brake system for an automotive vehicle tractor including a dual tractor master cylinder assembly, hydraulic ducts leading separately therefrom to separate tractor wheel brakes, a trailer brake system including a trailer master cylinder on the tractor, a hydraulic connection between the trailer master cylinder and the trailer brakes and a means operatively connecting the trailer master cylinder and some of the tractor wheel brakes.

2. The device of claim 1 characterized by the fact that the connection between the trailer master cylinder and some of the brakes controlled by the tractor master cylinder includes means interposed between the tractor master cylinder and such tractor brakes for temporarily interrupting the hydraulic connection between the tractor master cylinder and such brakes and for simultaneously directing hydraulic pressure to such brakes responsive to the trailer master cylinder.

3. The device of claim 2 characterized by the fact that the interrupting means includes a slave cylinder, a bypass therein, normally open to permit fluid flow from the tractor master cylinder to such wheel brakes and means responsive to the trailer master cylinder for closing said bypass and for directing pressure from the trailer master cylinder to such brakes.

4. The device of claim 2 characterized by the fact that the interrupting means includes a slave cylinder, a piston therein, a bypass controlled by said piston, between the tractor master cylinder and the interrupted wheel brakes, and a hydraulic connection between the trailer master cylinder and the slave cylinder adapted responsive to the trailer master cylinder to displace the piston in the slave cylinder, close the bypass and direct pressure from the trailer master cylinder to the interrupted wheel brakes.

5. The device of claim 2 characterized by the fact that the interrupting means between the tractor master cylinder and the brakes include a slave cylinder, the intake port of which is connected to the tractor master cylinder, the outlet port of which is connected to the brakes, a piston movable in the cylinder, yielding means for biasing it in position to open the intake and outlet ports for free passage of hydraulic fluid therethrough and means actuated by the trailer master cylinder for overcoming such biasing means and exerting pressure by the piston through the exhaust port to the brakes.

6. The device of claim 1 characterized by the fact that a slave cylinder in series in one of said ducts has an entrance port connected by the duct to the tractor master cylinder, a discharge port connected by the duct to some of the tractor wheel brakes, a piston in the slave cylinder, spring means for biasing it in upstream position, a bypass between the two ports including a valve seat, a valve, a stop adapted when the piston is in upstream position to unseat the valve to permit free flow between the two ports, an actuating cylinder, a driving connection between it and the piston in the slave cylinder, wherein said connecting means includes a hydraulic connection between the actuating cylinder and the trailer master cylinder whereby the trailer master cylinder through the actuating cylinder moves the piston to seat the valve to interrupt the connection between the tractor master cylinder and the brakes and apply pressure in the downstream end of the slave cylinder to apply pressure on the brakes in response to the trailer master cylinder.

No references cited.

MARTIN P. SCHWADRON, *Primary Examiner.*

R. R. BUNEVICH, *Assistant Examiner.*